United States Patent
Newton

(10) Patent No.: US 6,268,792 B1
(45) Date of Patent: Jul. 31, 2001

(54) PROGRESSIVE BRAKE LIGHT GAUGE

(76) Inventor: John D. Newton, 8 Danesleigh Gardens, Leigh-On-Sea, Essex (GB), SS9 4NL ( * ) Notice: Subject to any disclaimer, the term of this patent is extended or adjusted under 35 U.S.C. 154(b) by 0 days.

(21) Appl. No.: 09/078,632

(22) Filed: May 14, 1998

(51) Int. Cl.[7] .................................................. B60Q 1/50
(52) U.S. Cl. ........................ 340/467; 340/463; 340/464; 340/468; 340/479; 73/488
(58) Field of Search ..................... 340/467, 463, 340/464, 468, 479, 466; 73/488, 489, 491

(56) References Cited

U.S. PATENT DOCUMENTS

| | | | |
|---|---|---|---|
| 4,556,862 | * 12/1985 | Meinershagen | 340/466 |
| 5,089,805 | * 2/1992 | Salsman | 340/467 |
| 5,148,147 | * 9/1992 | Kobres | 340/464 |
| 5,150,098 | * 9/1992 | Rakow | 340/479 |
| 5,211,466 | * 5/1993 | Jarocki et al. | 362/83.3 |
| 5,231,373 | * 7/1993 | Freeman et al. | 340/469 |
| 5,258,740 | * 11/1993 | Viano et al. | 340/467 |
| 5,404,130 | * 4/1995 | Lee et al. | 340/479 |
| 5,481,243 | * 1/1996 | Lurie et al. | 340/467 |
| 5,499,009 | * 3/1996 | Davis | 340/468 |
| 5,565,841 | * 10/1996 | Pandohie | 340/479 |
| 5,594,416 | * 1/1997 | Gerhaher | 340/467 |
| 5,717,377 | * 2/1998 | Gao | 340/467 |

* cited by examiner

*Primary Examiner*—Jeffery Hofsass
*Assistant Examiner*—Toan Pham

(57) ABSTRACT

A vehicular deceleration indication system is provided including an accelerometer situated within a vehicle and adapted to detect a deceleration of the vehicle from an amount of change in momentum thereof with respect to the force of gravity. A lamp assembly includes a plurality lamps each adapted to illuminate upon the actuation thereof. Also included is a control mechanism adapted to actuate the lamps in a predetermined sequence as the detected deceleration increases.

12 Claims, 4 Drawing Sheets

| (% OF MAXIMUM PRESSURE) | LIGHT (● = ILLUMINATED) 0 1 2 3 4 5 6 7 8 9 10 |
|---|---|
| 0 | (ALL OFF) |
| 20 | . . . . . ● ● . . . . |
| 40 | . . . . ● ● ● ● . . . |
| 60 | . . . ● ● ● ● ● ● . . |
| 80 | . . ● ● ● ● ● ● ● ● . |
| 100 | ● ● ● ● ● ● ● ● ● ● ● |
| 0 | (ALL OFF) |
| 20 | . ● . . . . . . . ● . |
| 40 | . ● ● . . . . . ● ● . |
| 60 | . ● ● ● . . . ● ● ● . |
| 80 | . ● ● ● ● . ● ● ● ● . |
| 100 | ● ● ● ● ● ● ● ● ● ● ● |
| 0 | (ALL OFF) |
| 10 | ● . . . . . . . . . . |
| 20 | ● ● . . . . . . . . . |
| 30 | ● ● ● . . . . . . . . |
| 40 | ● ● ● ● . . . . . . . |
| 50 | ● ● ● ● ● . . . . . . |
| 60 | ● ● ● ● ● ● . . . . . |
| 70 | ● ● ● ● ● ● ● . . . . |
| 80 | ● ● ● ● ● ● ● ● . . . |
| 90 | ● ● ● ● ● ● ● ● ● . . |
| 100 | ● ● ● ● ● ● ● ● ● ● ● |
| 0 | (ALL OFF) |
| 10 | ● . . . . . . . . . ● |
| 20 | ● ● . . . . . . . . ● |
| 30 | ● ● ● . . . . . . . ● |
| 40 | ● ● ● ● . . . . . . ● |
| 50 | ● ● ● ● ● . . . . . ● |
| 60 | ● ● ● ● ● ● . . . . ● |
| 70 | ● ● ● ● ● ● ● . . . ● |
| 80 | ● ● ● ● ● ● ● ● . . ● |
| 90 | ● ● ● ● ● ● ● ● ● . ● |
| 100 | ● ● ● ● ● ● ● ● ● ● ● |

FIG. 2

PROGRESSIVE BRAKE LIGHT GAUGE

BACKGROUND OF THE INVENTION

1. Field of the Invention

The present invention relates to brake lights and more particularly pertains to a new progressive brake light gauge for providing an indication of the extent to which the vehicle in front is decelerating.

2. Description of the Prior Art

The use of brake lights is known in the prior art. More specifically, brake lights heretofore devised and utilized are known to consist basically of familiar, expected and obvious structural configurations, notwithstanding the myriad of designs encompassed by the crowded prior art which have been developed for the fulfillment of countless objectives and requirements.

Known prior art brake lights include U.S. Pat. No. 5,150,098; U.S. Pat. No. 4,918,424; U.S. Pat. No. 4,170,723; U.S. Pat. Des. 311,962; U.S. Pat. Des. 361,962; and U.S. Pat. Des. 332,234.

In these respects, the progressive brake light gauge according to the present invention substantially departs from the conventional concepts and designs of the prior art, and in so doing provides an apparatus primarily developed for the purpose of providing an indication of the extent to which the vehicle in front is decelerating.

SUMMARY OF THE INVENTION

In view of the foregoing disadvantages inherent in the known types of brake lights now present in the prior art, the present invention provides a new progressive brake light gauge construction wherein the same can be utilized for providing an indication of the extent to which the vehicle in front is decelerating.

The general purpose of the present invention, which will be described subsequently in greater detail, is to provide a new progressive brake light gauge apparatus and method which has many of the advantages of the brake lights mentioned heretofore and many novel features that result in a new progressive brake light gauge which is not anticipated, rendered obvious, suggested, or even implied by any of the prior art brake lights, either alone or in any combination thereof.

To attain this, the present invention generally comprises an accelerometer situated within a vehicle. During use, the accelerometer is adapted to detect a deceleration of the vehicle from an amount of change in momentum thereof with respect to the force of gravity. This being significantly different to all previous patents, in that the new brake lights display a guide to the actual rate of deceleration by the vehicle. FIG. 3 shows a lamp assembly including a plurality of horizontally oriented, linearly aligned lamps. An illuminateable peripheral lamp may be situated about a perimeter of the linear aligned lamps. Preferably, the lamp assembly is mounted on a rear of the vehicle. In use, each lamp of the lamp assembly is adapted to illuminate upon the actuation thereof. A mode selection switch is provided for allowing a user to select the operation of the system in one of four modes. Such modes include a first mode of operation, a second mode of operation, a third mode of operation, and a fourth mode of operation. Further included is memory means for continuously monitoring the deceleration detected by the accelerometer and further storing the maximum deceleration detected. The memory means is adapted to be reset. Connected between the accelerometer, lamp assembly, mode selection switch and memory means is control means. In each mode the control means actuates the lamps of the lamp assembly as a function of a percentage of the maximum deceleration.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new progressive brake light gauge apparatus and method which has many of the advantages of the brake lights mentioned heretofore and many novel features that result in a new progressive brake light gauge which is not anticipated, rendered obvious, suggested, or even implied by any of the prior art brake lights, either alone or in any combination thereof.

It is another object of the present invention to provide a new progressive brake light gauge which may be easily and efficiently manufactured and marketed.

It is a further object of the present invention to provide a new progressive brake light gauge which is of a durable and reliable construction.

An even further object of the present invention is to provide a new progressive brake light gauge which is susceptible of a low cost of manufacture with regard to both materials and labor, and which accordingly is then susceptible of low prices of sale to the consuming public, thereby making such progressive brake light gauge economically available to the buying public.

Still yet another object of the present invention is to provide a new progressive brake light gauge which provides in the apparatuses and methods of the prior art some of the advantages thereof, while simultaneously overcoming some of the disadvantages normally associated therewith.

Still another object of the present invention is to provide a new progressive brake light gauge for providing an indication of an extent to which the vehicle in front is slowing down.

Even still another object of the present invention is to provide a new progressive brake light gauge that includes an accelerometer situated within a vehicle and adapted to detect a deceleration of the vehicle from an amount of change in momentum thereof with respect to the force of gravity. A lamp assembly includes a plurality lamps each adapted to illuminate upon the actuation thereof. Also included is a control mechanism adapted to actuate the lamps in a predetermined, but selectable, sequence as the detected deceleration increases.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a table depicting the operation of each mode of operation of the present invention which could also have pulsing illumination for the two final phases of illumination.

DESCRIPTION OF THE PREFERRED EMBODIMENT

Figure 1:
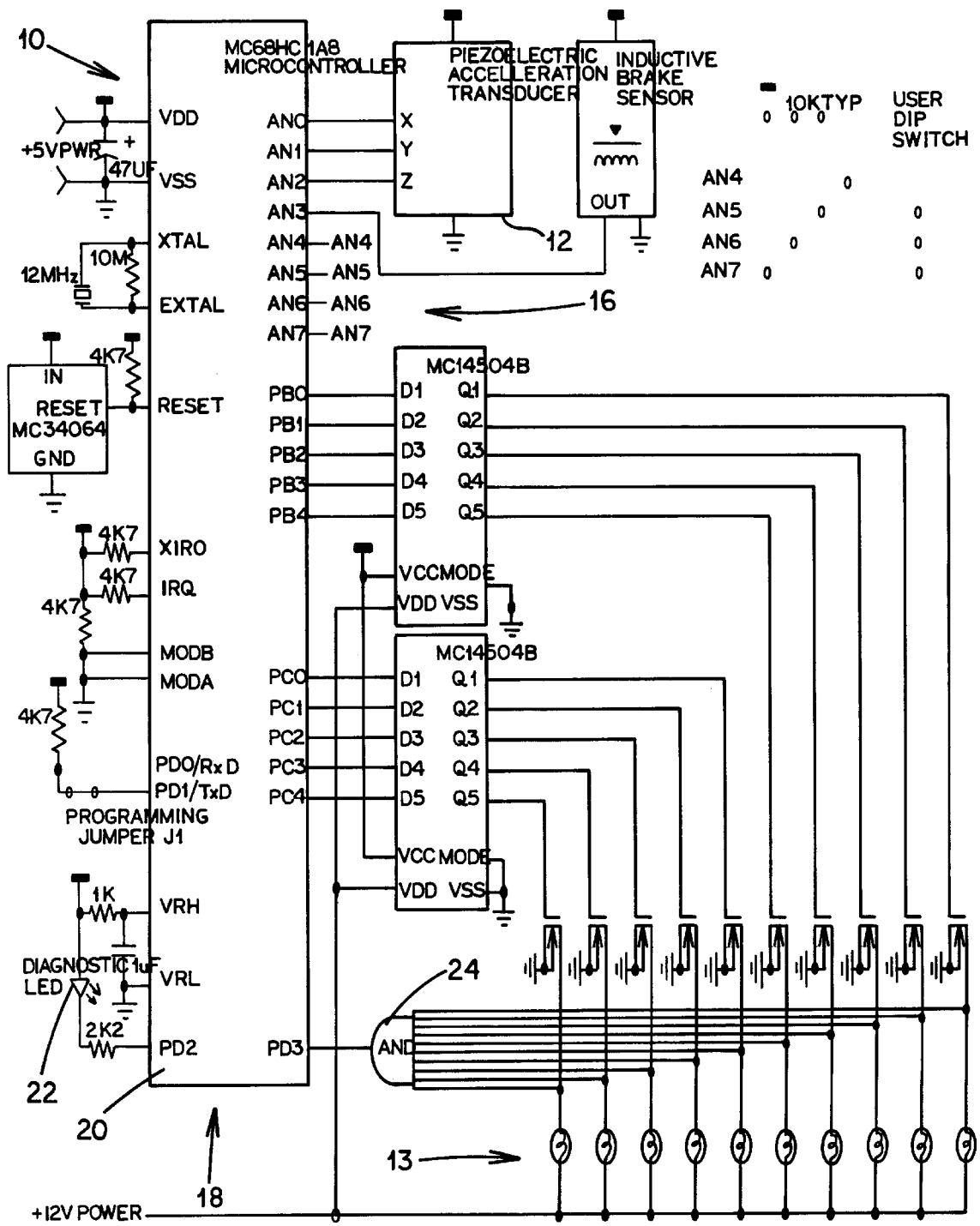
FIG. 1 is a schematic diagram of a new progressive brake light gauge according to the present invention.

With reference now to the drawings, and in particular to FIGS. 1 through 5 thereof, a new progressive brake light gauge embodying the principles and concepts of the present invention and generally designated by the reference numeral 10 will be described.

The present invention, designated as numeral 10, includes an accelerometer 12 situated within a vehicle. During use, the accelerometer is adapted to detect a deceleration of the vehicle from an amount of change in momentum thereof with respect to the force of gravity. To relay what the accelerometer detects, the same utilizes an output signal with varying voltage levels corresponding to the amount of deceleration. As such, no reliance is made upon a mechanical brake foot pedal or the like which may render inaccurate results. It should be noted, however, that an inductive brake sensor, gyroscopic sensor, or the like may be used as a back-up sensor if desired. As such, the integrity of the accelerometer may be constantly checked.

Figure 3:
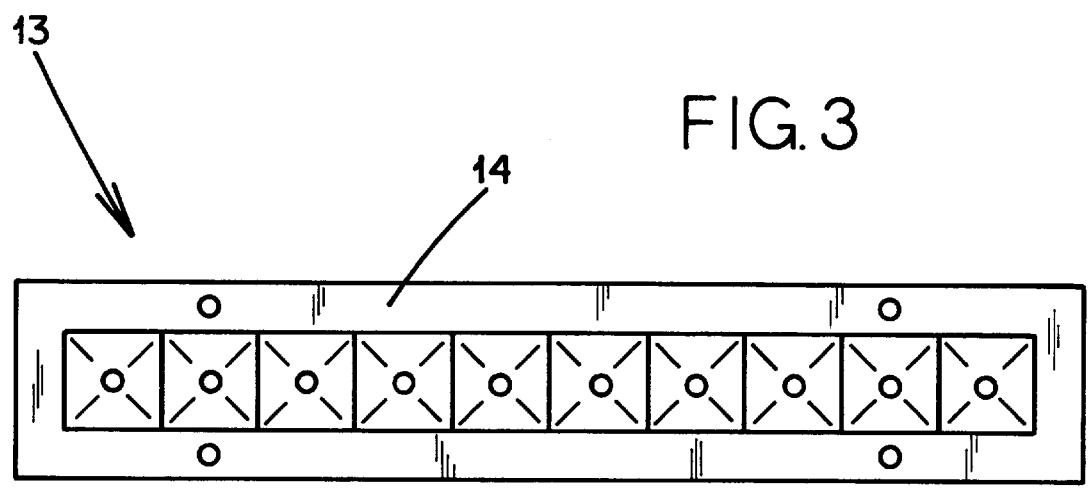
FIG. 3 is a front view of the lamp assembly of the present invention with or without peripheral illumination.
Figure 4:
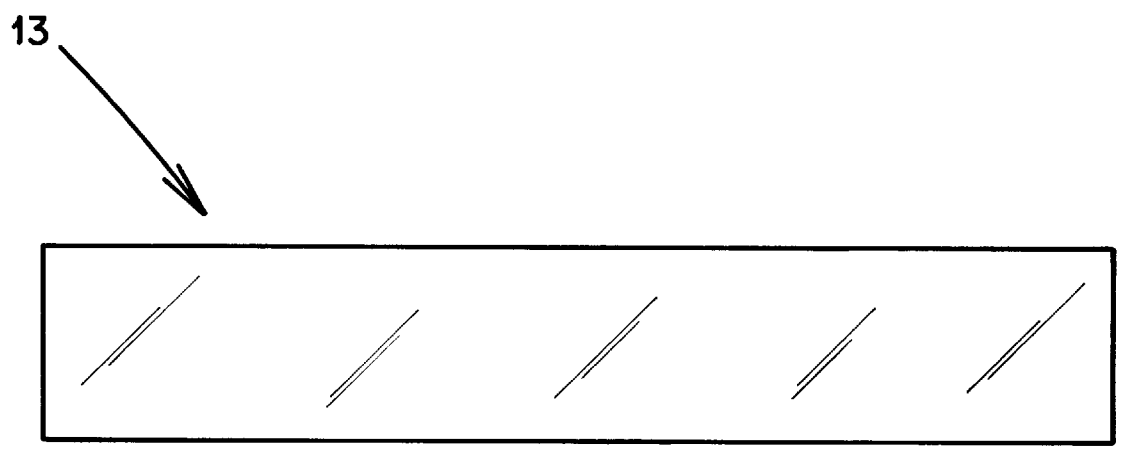
FIG. 4 is a rear view of the lamp assembly shown in FIG. 3.
Figure 5:
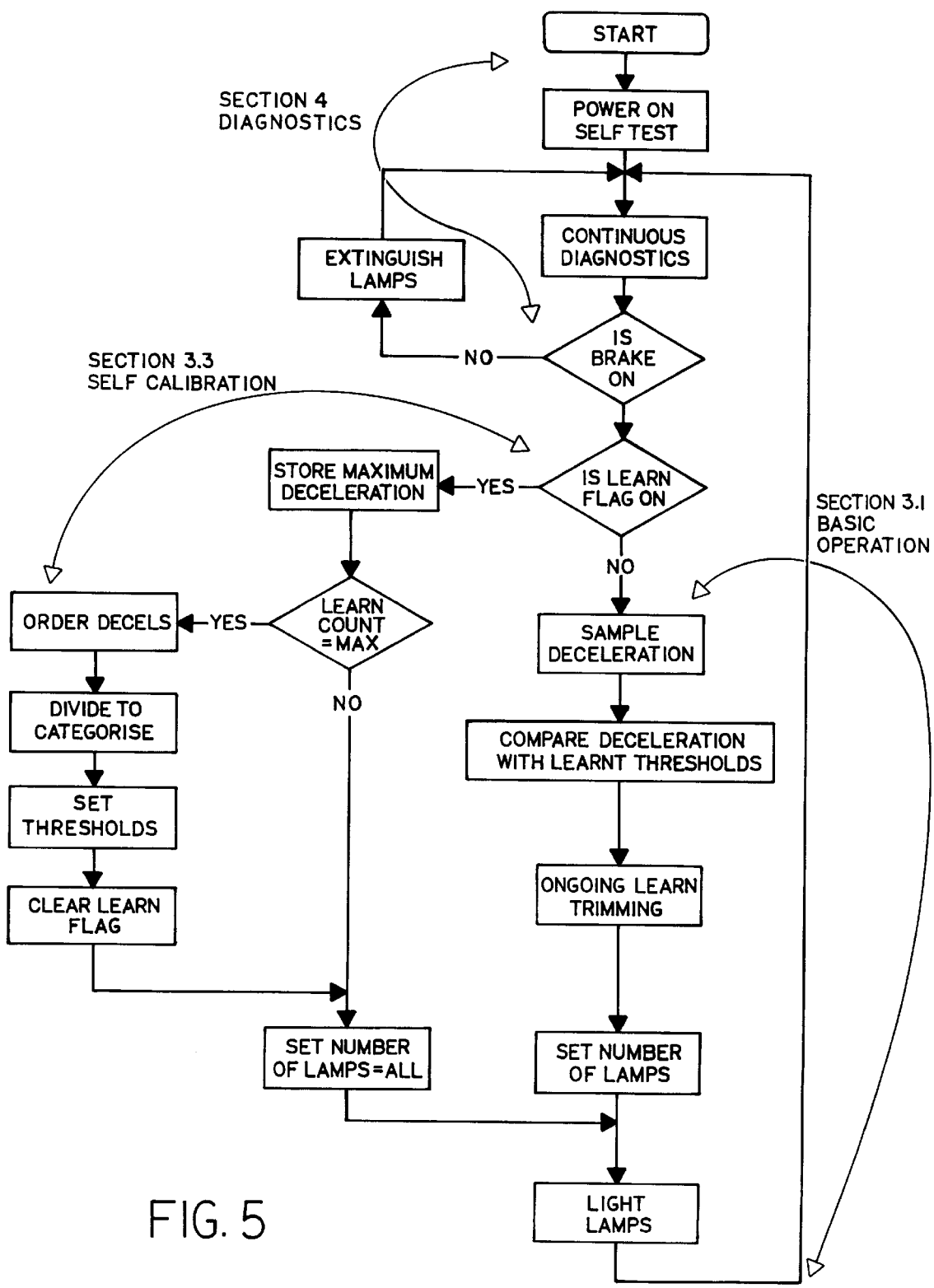
FIG. 5 is a flow chart showing the operation of the present invention with specific relation to the learning capabilities thereof.

FIG. 3 shows a lamp assembly 13 including a plurality of horizontally oriented, linearly aligned lamps. An illuminate-able peripheral lamp 14 is situated about a perimeter of the linear aligned lamps. It should be noted that the peripheral lamp could actually includes multiple lamps encompassing the remaining linear aligned lamps, as shown in FIG. 3. Preferably, the lamp assembly is mounted on a rear of the vehicle. In use, each lamp of the lamp assembly is adapted to illuminate upon the discrete actuation thereof.

A mode selection switch 16 is provided for allowing a user to select the operation of the system in one of four modes. Such modes include a first mode of operation, a second mode of operation, a third mode of operation, and a fourth mode of operation. Details relating to each mode of operation will be set forth hereinafter.

Further included is memory means for continuously monitoring the deceleration detected by the accelerometer and further storing the maximum deceleration detected. The memory means is adapted to be reset thus requiring the memory means to again "learn" a new maximum deceleration significantly reducing the need for calibration to vehicles of different braking, because of size, height, weight, etc. Note FIG. 5.

Connected between the accelerometer, lamp assembly, mode selection switch and memory means is control means 18. The control means preferably takes the form of a microchip 20 with onboard control circuitry, look-up tables, memory, encoders and the like. In each mode, the control means actuates the lamps of the lamp assembly as a function of a percentage of the maximum deceleration.

As shown in FIG. 2, the control means, in the first mode of operation, is adapted to actuate the lamps from center lamps of the lamp assembly to end lamps as the detected deceleration increases. In the present mode, the peripheral lamp is illuminated only upon the detection of the maximum deceleration. In the second mode of operation, the control means is adapted to actuate the lamps from the end lamps to the center lamps as the detected deceleration increases. Further, the peripheral lamp is illuminated upon the detection of any deceleration.

The control means, in the third mode of operation, serves to actuate the lamps from one set of the end lamps to another set of the end lamps as the detected deceleration increases and further illuminate the peripheral lamp only upon the detection of the maximum deceleration. Finally, in the fourth mode of operation, the control means actuates the lamps from one set of the end lamps to another set of the end lamps as the detected deceleration increases. In this final mode, the peripheral lamp is illuminated upon the detection of any deceleration. An additional provision will exist to automatically pulse a number of sections of the lamps at, or between, different stages, thereby providing further indication of extreme deceleration, and create a distinction between the present invention and existing secondary brake warning systems.

During use, the number of lamps illuminated with each incremental increase in the percentage of maximum deceleration may be varied from that shown in FIG. 2. Further, it should be noted that when the present invention is first installed or is reset, the control means is in a "learn" mode at the start of which any deceleration is deemed the maximum deceleration. As such, a maximum number of lights are illuminated upon any braking. Thus, a safeguard is afforded.

As time progresses, however, the maximum deceleration is increased as different driving situations are encountered. Whenever any change in the maximum deceleration occurs, the control means recalculates the amount of deceleration associated with each percentage of the maximum deceleration that it takes to illuminate each number of lights.

Preferably, a diagnostic check is conducted during each startup. If any component of the check results in failure, a flashing LED 22 indicates the same. One of the checks includes the illumination of each lamp, whereby an AND gate 24 is used to check that each lamp is operational. Note FIG. 1. Failure of the foregoing test results in constant illumination of the LED.

The most significant benefits of the present invention will be experienced when the rate of deceleration changes during braking, or the braking performance of a vehicle is not as expected. In heavy, slow moving traffic, when following a vehicle with automatic transmission, a driver may be become desensitized to the brake lights of the vehicle in front if it's driver is resting his foot constantly on the brake pedal. If eventually, the vehicle in front has cause to actually brake hard, the driver behind has little or no warning of this action. The present invention would give the correct information concerning this action, thereby possibly preventing a rear end collision.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular deceleration indicating system comprising, in combination:
   an accelerometer situated within a vehicle and adapted to detect a deceleration of the vehicle from an amount of change in momentum thereof with respect to the force of gravity;
   a lamp assembly including a plurality of horizontally oriented, linearly aligned lamps with perhaps an illuminateable peripheral lamp situated about a perimeter of the linear aligned lamps, the lamp assembly mounted on a rear of the vehicle, each lamp of the lamp assembly adapted to illuminate upon the actuation thereof;
   a mode selection switch for allowing a user to select the operation of the system in one of four modes including a first mode of operation, a second mode of operation, a third mode of operation, and a fourth mode of operation;
   memory means for continuously monitoring the deceleration detected by the accelerometer and further storing the maximum deceleration detected, wherein the memory means is adapted to be reset; and
   control means connected between the accelerometer, lamp assembly, mode selection switch and memory means, the control means, in the first mode of operation, adapted to actuate the lamps from center lamps of the lamp assembly to end lamps as the detected deceleration increases wherein the peripheral lamp is illuminated only upon the detection of the maximum deceleration, the control means, in the second mode of operation, adapted to actuate the lamps from the end lamps to the center lamps as the detected deceleration increases wherein the peripheral lamp is illuminated upon the detection of any deceleration, the control means, in the third mode of operation, adapted to actuate the lamps from one set of the end lamps to another set of the end lamps as the detected deceleration increases wherein the peripheral lamp is illuminated only upon the detection of the maximum deceleration, the control means, in the fourth mode of operation, adapted to actuate the lamps from one set of the end lamps to another set of the end lamps as the detected deceleration increases wherein the peripheral lamp is illuminated upon the detection of any deceleration.

2. A vehicular deceleration indicating system comprising:
   a deceleration detector adapted to detect a deceleration of a vehicle;
   a lamp assembly including a plurality lamps each adapted to illuminate upon the actuation thereof; and
   control means connected between the accelerometer and lamp assembly, the control means adapted to actuate the lamps in a predetermined sequence as the detected deceleration increases;
   wherein at least one sequence includes actuating the lamps from center lamps of the lamp assembly to end lamps as the detected deceleration increases;
   wherein a peripheral lamp is illuminated only upon the detection of a maximum deceleration.

3. A vehicular deceleration indicating system as set forth in claim 2 and further including a mode switch for selectively determining the sequence.

4. A vehicular deceleration indicating system as set forth in claim 2 wherein at least one sequence includes actuating the lamps from end lamps to center lamps as the detected deceleration increases.

5. A vehicular deceleration indicating system as set forth in claim 4 wherein the peripheral lamp is illuminated upon the detection of any deceleration.

6. A vehicular deceleration indicating system as set forth in claim 2 wherein at least one sequence includes actuating the lamps from one set of end lamps to another set of end lamps as the detected deceleration increases.

7. A vehicular deceleration indicating system as set forth in claim 6 wherein the peripheral lamp is illuminated only upon the detection of maximum deceleration.

8. A vehicular deceleration indicating system as set forth in claim 2 wherein at least one sequence includes actuating the lamps from one set of the end lamps to another set of the end lamps as the detected deceleration increases.

9. A vehicular deceleration indicating system as set forth in claim 8 wherein the peripheral lamp is illuminated upon the detection of any deceleration.

10. A vehicular deceleration indicating system as set forth in claim 2 and further including memory means for continuously monitoring the deceleration detected by the deceleration detector and further storing a maximum deceleration detected.

11. A vehicular deceleration indicating system as set forth in claim 10 wherein the memory means is adapted to be reset.

12. A vehicular deceleration indicating system comprising:
   deceleration detector for detecting a deceleration of a vehicle;
   a lamp assembly including a plurality lamps adapted to illuminate upon the actuation thereof; and
   control means connected between the deceleration detector and lamp assembly, the control means adapted to actuate the lamps in a predetermined sequence as the detected deceleration increases;
   wherein at least one sequence includes actuating the lamps from one set of end lamps to another set of end lamps as the detected deceleration increases;
   wherein a peripheral lamp is illuminated only upon the detection of maximum deceleration.

* * * * *